3,681,177
PACKING APPARATUS
Leslie Raymond Preston, London, Victor James Pope, Great Missenden, John Stagg, Fulmer, and Ronald Sydney Green, High Wycombe, England, assignors to W. R. Grace & Company, New York, N.Y.
Filed Apr. 26, 1971, Ser. No. 137,369
Int. Cl. B30b 15/34; B65b 7/04
U.S. Cl. 156—583                                8 Claims

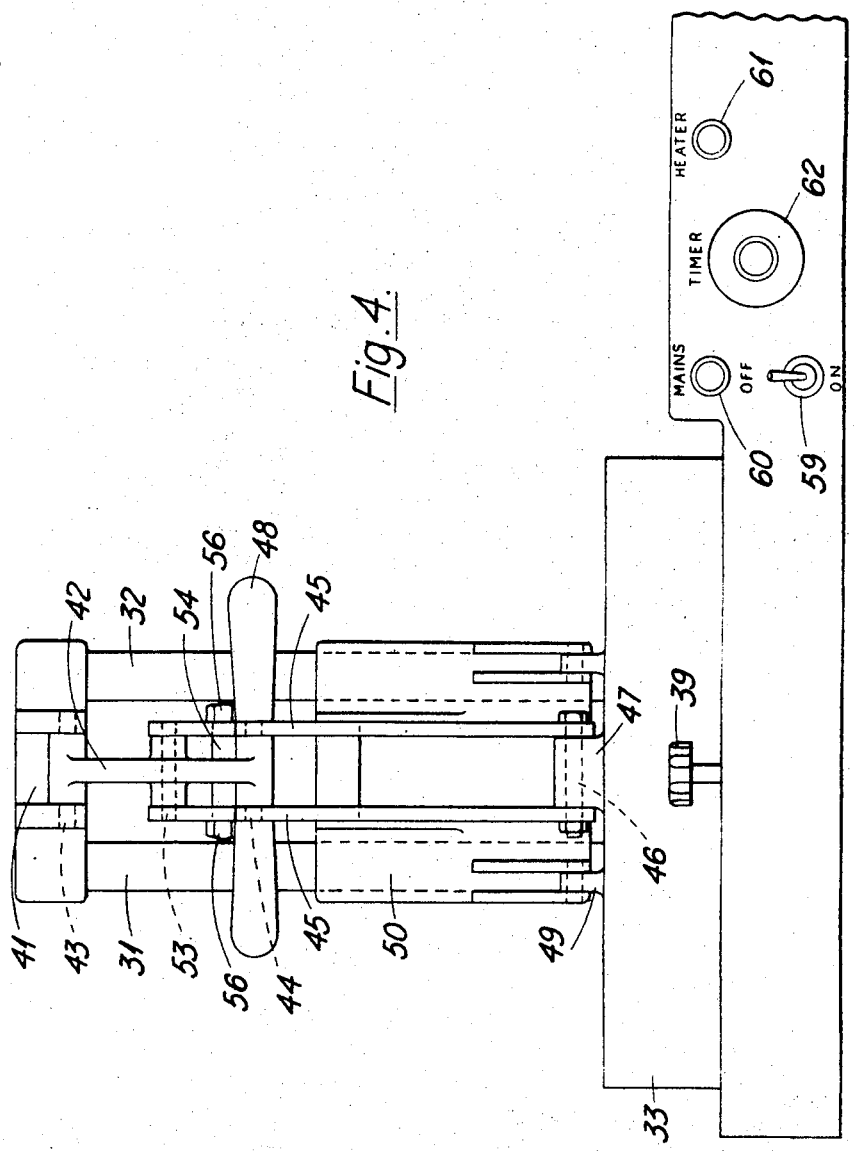

ABSTRACT OF THE DISCLOSURE

The specification discloses packing articles, in this case sandwiches, where the articles are of a triangular form and packing is effected by placing at least two pairs of the articles side by side between the layers of a single web of centre-folded film. The articles are arranged to have the same orientation with one side of the triangle parallel to the film centre-fold. Sealing may be effected by bringing together sealing plates having co-operating heat seal elements arranged as a pair of similar triangles each larger than the triangular outline of the articles. One additional seal line is required but may comprise one of the seal lines of a similar preceding operation.

---

The present invention relates to a method of and apparatus for packaging articles, and more particularly to packaging articles which have a substantially straight side disposed opposite to an apex portion. Such articles will be referred to herein as being "of the type specified" and the invention will be exemplified with the article in the form of a diagonally cut sandwich.

Hitherto articles of this nature, for example diagonally cut sandwiches, have been individually packaged by hand, either by placing the article in a bag of paper or plastics material and then sealing the bag with adhesive tape, or by folding a single sheet of paper or plastics material around the article. Considering by way of example the packaging of diagonally cut sandwiches which are triangular in shape, the conventional method of placing the sandwich in a plastics bag has the disadvantage that a considerable flap of plastics material must be doubled over with consequent wastage of the bag material. There is also difficulty in providing a hermetic seal for the finished package. Similar problems arise in respect of wrapping the sandwich in a single sheet of paper in that the triangular shape of the article will necessitate the provision of three separate consecutively formed folds which will again lead to considerable overlap and wastage of the packaging material and also difficulty in providing a true hermetic seal.

According to the present invention there is provided apparatus for packaging articles of the type having a substantially straight side disposed opposite an apex portion, and comprising a sealing unit including a fixed base plate, a relatively movable sealing plate having heat sealing elements disposed in a triangular array, a resilient bed on the base plate to co-operate with the heat sealing elements, manually operable means for positioning said movable sealing plate, and means for supplying centre-folded heat sealable film to be sealed, said film supplying means being arranged to supply the film with the film fold line along a given direction which runs across a corner of the triangular array and in parallel to a side of the triangular array opposite the said corner when the movable sealing plate and fixed base plate are in contact, said manually operable means comprising at least one movable support column having upper and lower ends and adapted to support said movable sealing plate, means for adjusting the vertical position of the support column with respect to the fixed base plate, and toggle means connected between on the one hand the movable sealing plate and on the other hand the upper end of said at least one movable support column. Preferably the apparatus further includes means for adjusting said toggle means to control the angular relationship between the planes of said fixed base plate and said movable sealing plate.

Desirably said movable sealing plate has edges which are, respectively, near and far from said at least one support column, and first and second link means are connected to said lever at points of attachment which are at different spacings from the pivotal connection of said lever to said at least one column, said first and second link means being further connected each to one of said near and far edges, whereby one of said near or far edges will move away from said fixed plate more rapidly than will the other of said near and far edges to cause said sealing plate simultaneously to move away from and pivot with respect to said fixed plate. More desirably said lever may comprise bell crank means having a first end connected to said at least one column, a second end connected to said first link means and an intermediate portion connected to said second link means.

In order that the present invention may more readily be understood, the following description is given, merely by way of example, reference being made to the accompanying drawings in which:

FIG. 4 is a front elevational view of the apparatus of FIG. 3.

Figure 1:
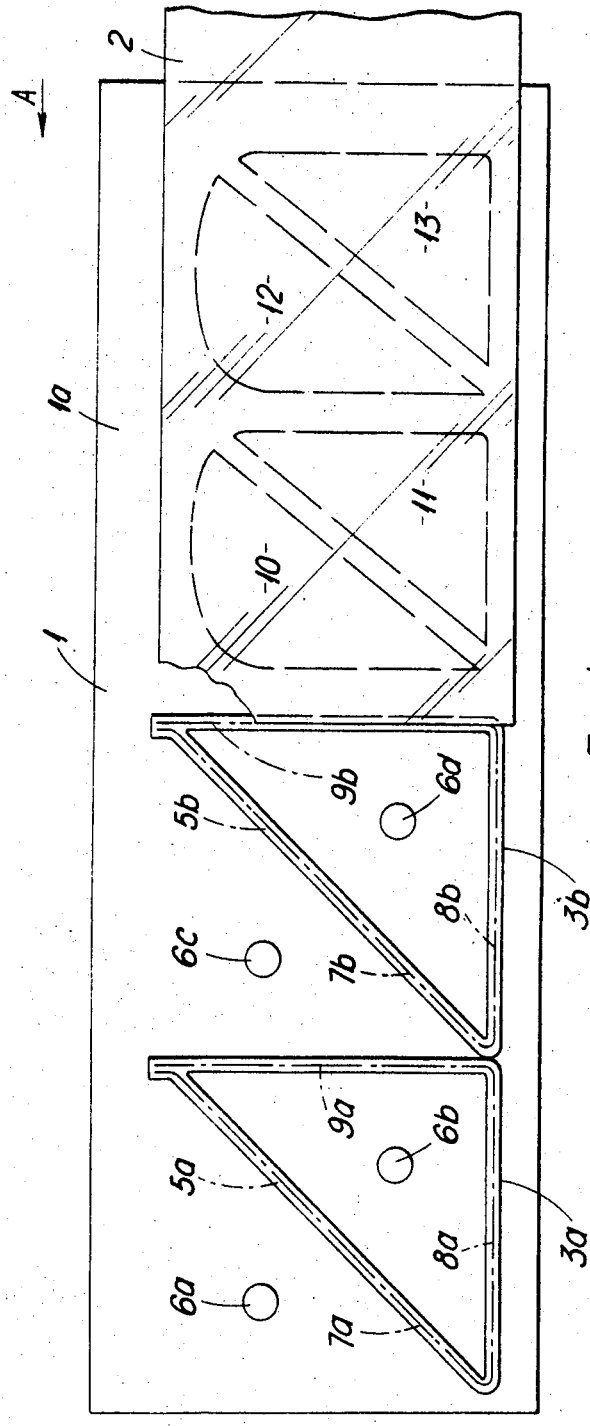
FIG. 1 is a top plan view of the fixed sealing plate of a packaging apparatus in accordance with the present invention.

Referring now to the drawings, there is shown a fixed base plate 1 along which a web of centre-folded polypropylene film 2 is passed along the direction of the arrow A in FIG. 1. A suitable supply roll for the polypropylene film is provided but not illustrated.

Figure 2:
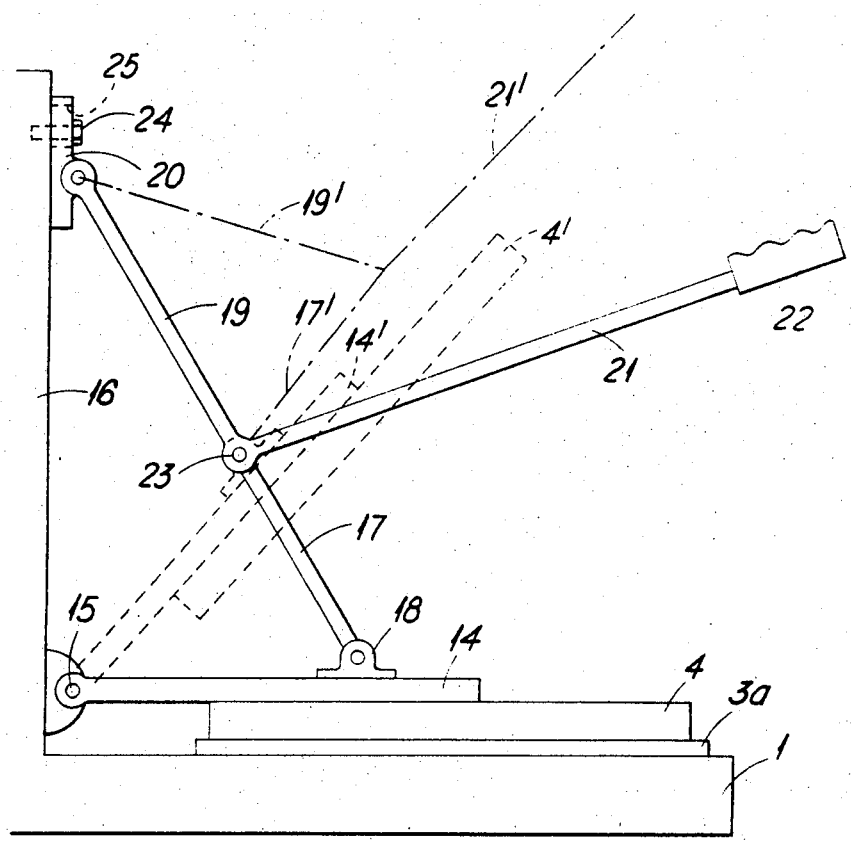
FIG. 2 is a side elevational view of the apparatus of FIG. 1.

The base plate 1 is provided with two similar right angled triangular arrays 3a, 3b of cushioning material which will cooperate with similarly arranged heat sealing elements of a relatively movable sealing plate 4, shown in FIG. 2 but missing from FIG. 1. The disposition of the heat sealing elements of the movable sealing plate is illustrated by the use of chain dotted lines 5a and 5b shown in FIG. 1. From the chain dotted lines 5a and 5b it can be seen that the triangular arrays of heat sealing elements are arranged so that each triangle comprises a single bent element the ends of which are disposed at one corner of the triangle. Each element is carefully connected to the movable sealing plate 4 so that the corners of the triangle are permitted outward movement to take up expansion of the heat sealing elements in use of the apparatus.

The fixed base plate is also provided with four package ejecting elements 6a, 6b, 6c and 6d which are connected to a common ejector mechanism (not shown) for discharging packaged sandwiches. The ejector elements have been omitted from FIG. 2 to assist in clarifying that view.

In order to assist in subsequent explanation of the packaging operation the three sides of each triangular array of heat sealing elements have been separately referenced 7a, 7b; 8a, 8b; and 9a, 9b.

Also shown in FIG. 1 are four diagonally-cut sandwiches referenced 10, 11, 12 and 13, positioned on a loading area 1a of the base plate 1.

Referring now to FIG. 2, the movable sealing plate 4 can be seen to be secured to an arm 14 pivotally mounted at 15 for movement about a horizontal axis. The pivot axis at 15 is fixed in relation to both the fixed base plate 1 and a fixed vertical support bracket 16.

Pivotal movement of the arm 14 is achieved by way of a toggle mechanism comprising a first toggle member 17 pivotally secured to a boss 18 formed on the arm 14, and a second toggle member 19 pivotally secured to a boss 20 which is vertically movable with respect to the vertical support bracket 16. The second toggle member 19 has a toggle operating lever 21 extending substantially perpendicularly thereto and the end of the operating lever 21 is provided with a hand grip 22. FIG. 2 shows that the operating lever 21 is joined to the second toggle member 19 at the point of articulation 23 between the first and second toggle members 17 and 19 respectively.

As indicated above, the boss 20 is vertically movable with respect to the support bracket 16 and may be clamped by means of a bolt 24 threadedly engageable in the support bracket 16 but co-operating with a vertically extending slot 25 formed in the boss 20. Vertical adjustment of the position of the boss 20 will provide adjustment of the contact pressure between the movable sealing plate 4 and the resilient beds 3a, 3b.

The solid line positions shown in FIG. 2 denote the positions of the various elements of the drawing when the movable sealing plate 4 is in sealing contact with the fixed base plate 1. However, FIG. 2 also shows in broken line form the open or "loading" positions 4' and 14', respectively, of the movable sealing plate 4 and its support arm 14. The corresponding "loading" positions of the first and second toggle members 17 and 19 and the operating lever 21 are shown by chain-dotted lines at 17', 19' and 21', respectively.

The toggle structure 17, 19 is provided with a suitable stop mechanism (not shown) for ensuring that the point of articulation 23 between the two toggle members 17 and 19 can never move further left than the position shown in FIG. 2. Thus the toggle members 17 and 19 will, in the closed or "sealing" position of the movable sealing plate 4 always be collinear.

The heat sealing elements of the movable sealing plate 4 are electrically heated and are connected to an appropriate timer unit which will ensure that the heating elements are energised only for sufficient time to ensure a good seal between the two juxtaposed portions of the centre-folded film 2. The temperature of the heat sealing elements will also be controlled by a suitable temperature stabilising arrangement.

By way of further explanation, the operation of the illustrated and above described embodiment of sandwich packaging apparatus will now be described in detail.

As a fresh web of centre-folded film 2 is loaded onto the supply reel (not shown) the free edge of the film is pulled across the loading area 1a of the fixed base plate 1 and is laid on the resilient bed 3b so that the web of film material can be heat sealed by means of the sealing element portion 9b. The movable sealing plate 4 is then brought downwards by means of the operating lever 21 to seal the juxtaposed portions of the film 2 along the line 9b.

The sealing plate 4 may then be raised and four diagonally cut sandwiches 10, 11, 12 and 13 may be placed into the space between the juxtaposed film portions so that the sandwich 10 has one straight edge running parallel and adjacent to the seal just formed by the sealing element 9b and another "substantially straight" edge extending parallel and adjacent to the film fold line. The remaining three sandwiches 11, 12 and 13 may be arranged with respect to the now located sandwich 10.

The four sandwiches and the encompassing film are then moved leftwardly across the sealing plate 1 until they may be disposed to occupy the main sealing area of the base plate 1 so that the sandwich 11 lies enclosed within the triangular array of resilient bed 3a and the sandwich 13 lies similarly enclosed within the triangular array of the resilient bed 3b. The sandwiches 10 and 12 will then lie outside the triangles but will both be confined on one side by the film fold line. Sandwich 10 will be confined on another side by the seal just formed by the sealing element 9b and sandwich 12 will be confined on its corresponding side by that part of the bed 3a which will co-operate with the sealing element 9a. It is important, for best operation of the apparatus, for the previously formed seal at the free end of the web to be positioned so that it intersects the triangular array of sealing elements 7a, 8a and 9a adjacent the angle of the triangle between the sides 7a and 8a.

Now when the movable sealing plate 4 is lowered, by means of the operating lever 21, the previously formed end seal and the fold line of the film will intersect to form two sides of a triangular package enclosing the sandwich 10 and the sealing element 7a will seal together the two juxtaposed film portions along the line which intersects both the previously formed seal line and the fold line thereby enclosing the sandwich 10 completely. Similarly, the sandwich 12 will be completely enclosed by the film fold line, the seal line of the element 9a, and the seal line formed by the sealing element 7b, which will intersect both of the first mentioned lines. Although the seal element portions 8a and 9a do not touch or intersect the seal element portions 7b and 8b the respective points of intersection of these two pairs of sides are so close together that the heat of the sealing element will be dissipated at the two points of intersection with the result that the film in that area will be fused and will facilitate subsequent separation of the three packages containing the sandwiches 11, 12 and 13 respectively.

The packaging operation is finally completed by operation of the ejector mechanism to raise the ejector elements 6a, 6b, 6c and 6d to eject the sandwiches.

Clearly, the seal line formed by the element 9b will not only assist in sealing hermetically the sandwich 13 but will provide the starting seal line for the next set of similar sandwiches.

The heat sealing elements 5a and 5b are so constructed and controlled that they serve as both severing and sealing elements. Thus the four packaged sandwiches 10, 11, 12 and 13 are readily detachable from each other and from the remaining portion of the centre-folded film.

In practice the width of the centre-folded film will be such that there will be a slight wastage in the form of a strip of the order of 1 to 2 cm. wide disposed outside the sealing element portions 8a and 8b (i.e. below the line of these element portions as viewed in the drawings). Naturally, although this wastage can be reduced to an absolute minimum it is desirable to provide a slight excess of film width so that any outsize sandwiches, i.e. sandwiches having too much filling material, or formed from too thickly cut slices, or formed from too large a loaf, may still be packed by taking up the reserve of surplus material along the edges 8a, and 8b.

If the operator fails to ensure that the previously formed line of seal and cut at 9b does not intersect the location of the sealing elements 7a and 8a then the sandwich 10, although neatly packaged, will not be hermetically sealed. Thus, means may be provided for ensuring that the previously formed line of seal and cut may be disposed in the correct positioning, for example by providing a guide up to which the line of cut must be moved during each loading operation or by providing a control unit on the supply reel for ensuring that only the exact length of film required may be withdrawn in one advancing movement before the supply reel is locked temporarily.

It may also be preferable to provide a suitably formed loading arrangement on the loading area 1a of the base plate 1 to ensure that the sandwiches 10, 11, 12 and 13 may be rapidly and readily disposed in the correct positioning while the previous sandwiches are being sealed. However, in such an arrangement it may be important that the sealing element portion 9b is disposed substantially at the edge of the sealing plate 4 in order to ensure that the sandwich 10 may be pushed up against the seal line formed by the element 9a.

If it is found that the contact pressure of the sealing elements 5a and 5b on the resilient beds 3a and 3b decreases during the life of the apparatus, for example by a loss of resilience of the beds 3a and 3b, the pressure may be increased by slackening off the bolt 24, moving the boss 20 downwardly by the required amount and then retightening the bolt 24 so that, in future, the resilient beds 3a and 3b will be subjected to a greater degree of depression and will therefore be able to exert a stronger resistance force.

Although the illustrated arrangement of the toggle mechanism and the movable sealing plate will operate quite satisfactorily, it may be desired to provide much more ready access to the fixed base plate when the sealing plate is raised, for example by mounting the sealing plate 4 on a support bracket 16 which can be tilted backwards (anti-clockwise as viewed in FIG. 2), in order to provide a much greater clearance between the fixed base plate 1 and the sealing plate 4 in its open condition.

It has been found that sandwiches packed with the method and apparatus described and using polypropylene films are hermetically sealed to such an extent that the condition of the bread is still quite fresh even three days after packing. Hence the preferred embodiment of packaging method provides an extremely advantageous form of sandwich wrapping system and offers a distinct technical advance over the crude prior art methods of forming such packages.

Figure 3:
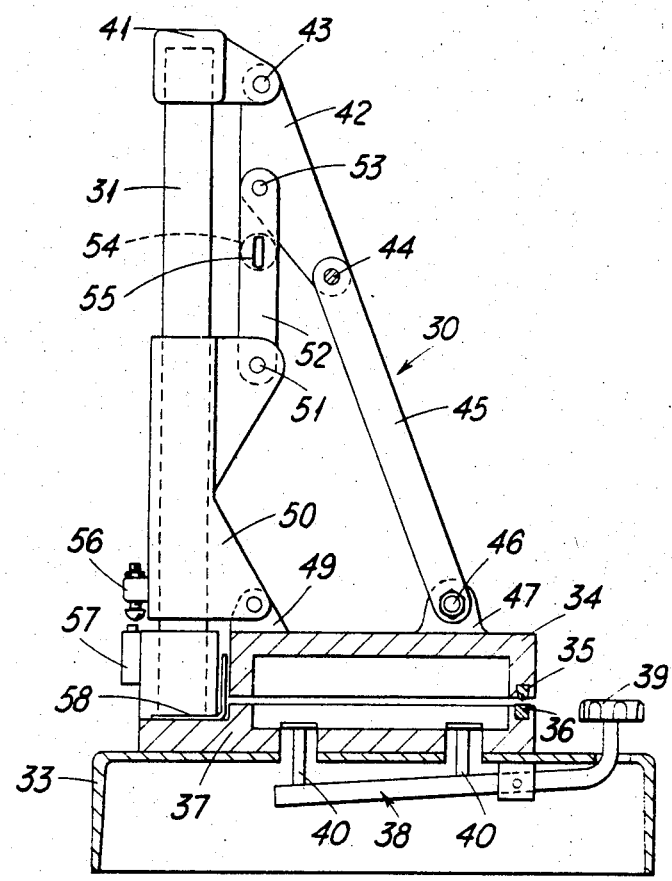
FIG. 3 is a side elevational view of a modified embodiment of sealing apparatus.

FIGS. 3 and 4 show side and front elevational views, respectively, of a second embodiment of sandwich packing machine generally referenced 30 and comprising a pair of upright columns 31 and 32 adjustably secured to the base 33 so as to be vertically movable to vary the vertical position of the movable sealing plate 34, thereby effecting an increase or decrease in the sealing force between the sealing strips 35 and 36 on the movable sealing plate 34 and the fixed base plate 37, respectively.

The ejector mechanism 38 is shown quite clearly in FIG. 3 and requires no detailed explanation other than to point out that a single ejector control 39 operates all four ejector pins 40.

A cross head 41 extending between the upper ends of the two columns 31 and 32 has one end of a bell crank 42 pivotally connected thereto by means of a pivot pin 43. A further pivot pin 44 extending transversely the bell crank 42 engages with the upper ends of each of a pair of parallel links 45 which extend obliquely downwardly towards respective ends of a pivot pin 46 securing the links to a lug 47 on the front edge of the movable sealing plate 34.

An operating handle 48 is secured to the linkage so as to be coaxial with the pivot pin 44 and thus raising of the handle 48 will pivot the bell crank 42 in the anti-clockwise sense (as viewed in FIG. 3) and cause the front edge of the movable sealing plate 34 to be raised.

The rear edge of the movable sealing plate 34 is provided with lugs 49 which are pivotally attached to a slide 50 carried by the columns 31 and 32 for movement vertically therealong. The other part of the slide 50 is connected by pivot pins 51 to further links 52 which extend upward to the mid point of the bell crank 42 and are secured thereto by a common pivot pin 53.

The two links 52 are joined by a horizontal bar 54 which serves as an abutment to prevent the bell crank 42 from rotating too far in the clockwise direction during closing of the movable sealing plate 34. Each of the links 52 has a vertically orientated elongate slot 55 through which threaded narrow diameter end portions of the bar 54 may extend to be clamped in any position along the length of the slot by means of nuts 56 shown in FIG. 4.

Clearly, as the handle 48 is lowered the bell crank 42 will rotate in a clockwise direction causing simultaneous downward movement of the pivot pins 44 and 53 but in such a manner that the pivot pin 44 descends more rapidly than the pivot pin 53 (by virtue of the different spacings of the pivot pins 44 and 53 from the fixed pivot pin 43 on the cross head 41). Downward movement of the pivot pin 53 will cause the links 52 to thrust the slide bracket 50 downwardly thereby lowering the rear edge of the sealing plate 34, but simultaneously the descending movement of the pivot pin 44 will cause the links 45 to thrust the front edge of the movable sealing plate 34 downwardly with a greater speed so that, when the bell crank 42 is in its extreme clockwise position the two sealing plates are in contact with the desired degree of compression of the sealing strips 35 and 36.

A study of the opening movement of the sealing plates will show that the movable sealing plate 34 rises and pivots in the anti-clockwise sense as viewed in FIG. 3 so as to provide the maximum possible access for loading unpacked sandwiches on the base plate 37.

Clearly, by raising the rod 54 in the slots 55, the extreme clockwise position of the bell crank 42 will be displaced slightly in the anti-clockwise sense as compared to the illustration of FIG. 3. Conversely, lowering and locking of the bar 54 will allow the bell crank to move even further clockwise.

Adjustment of the bar 54 will therefore enable alignment of the upper sealing plate 34 in a closed configuration in which it will be truly parallel to the fixed base plate 37, and it then merely remains to raise or lower the columns 31 and 32 so that the sealing strips 35 and 36 are compressed to the required degree when the two sealing plates 34 and 37 are closed.

The slide 50 carries an abutment screw 56 threadedly received in an associated lug to serve as a trip for a limit switch 57 to start the heater timer control once the slide 50 has reached its lowermost position, corresponding to the closed condition of the movable and fixed sealing plates 34 and 37 respectively. A suitable time delay circuit is actuated by the limit switch 57 and during operation of the delay circuit the heater is in operation. Once the delay circuit trips, the heater is switched off and a suitable pilot light may either ignite or extinguish (as desired) in order to indicate that the required time for sealing has elapsed.

The abutment screw 56 is, of course, vertically adjustable within the lug by means of the lock nut shown in FIG. 3 to effect adjustment of the working of the limit switch to ensure that, upon re-adjustment of the height of the columns 31 and 32, the abutment screw 56 will trip the limit switch 57 only when the slide 50 reaches its lowermost position.

FIG. 3 also shows a guide 58 for guiding the fold line of film web as it is moved across the base plate during a re-loading operation.

The front elevational view of FIG. 4 shows a mains "on-off" switch 59 and accompanying pilot light 60, and the pilot light 61 which will light up while the heater circuit is energised. Thus, in this embodiment, the heater pilot light 61 will extinguish once the sealing operation is complete. A further selector control 62 serves for selecting the desired heating time commensurate with the particular film dimensions and type used.

We claim:

1. Apparatus for packaging articles of the type having a substantially straight side disposed opposite an apex portion, and comprising a sealing unit including a fixed base plate, a relatively movable sealing plate having heat sealing elements disposed in a triangular array, a resilient bed on the base plate to co-operate with the heat sealing elements, manually operable means for positioning said movable sealing plate, and means for supplying centre-folded heat sealable film to be sealed, said film supplying means being arranged to supply the film with the film fold line along a given direction which runs across a corner of the triangular array and in parallel to a side of the triangular array opposite the said corner when the movable sealing plate and fixed base plate are in contact, said manually operable means comprising at least one movable support column having upper and lower ends and adapted to support said movable sealing plate, means for adjusting the vertical position of the support column with respect to the fixed base plate, and toggle means connected between on the one hand the movable sealing plate and on the other hand the upper end of said at least one movable support column.

2. Apparatus as set forth in claim 1, and further including means for adjusting said toggle means to control the angular relationship between the planes of said fixed base plate and said movable sealing plate.

3. Apparatus as set forth in claim 1, wherein said movable sealing plate has edges which are, respectively, near and far from said at least one support column, and first and second link means are connected to said lever at points of attachment which are at different spacings from the pivotal connection of said lever to said at least one column, said first and second link means being further connected each to one of said near and far edges, whereby one of said near or far edges will move away from said fixed plate more rapidly than will the other of said near and far edges to cause said sealing plate simultaneously to move away from and pivot with respect to said fixed plate.

4. Apparatus according to claim 3, wherein said lever comprises bell crank means having a first end connected to said at least one column, a second end connected to said first link means and an intermediate portion connected to said second link means.

5. Apparatus according to claim 4, and including abutment means for limiting movement of said bell crank means in a direction closing said sealing and base plates.

6. Apparatus according to claim 5, wherein said abutment means comprise an abutment adjustable longitudinally of said other link and engageable by said bell crank means.

7. Apparatus according to claim 4, wherein said bell crank means comprise a single bell crank and said first and second link means each comprise a pair of parallel links connected between said sealing plate and said single bell crank.

8. Apparatus according to claim 4, and further including a slide member movable longitudinally of said at least one column and articulated to both said second link means and said movable sealing plate, means being provided associated with said slide member for automatic supply of heat to said heat seal elements once said slide reaches a lowermost position on said at least one column.

References Cited

UNITED STATES PATENTS

| | | | |
|---|---|---|---|
| 2,581,608 | 1/1952 | Slatkin | 156—583 |
| 2,622,055 | 12/1952 | Lieder | 156—583 |
| 3,047,991 | 8/1962 | Siegel et al. | 156—583 |

DOUGLAS J. DRUMMOND, Primary Examiner

U.S. Cl. X.R.

53—373